United States Patent
Selvaraj et al.

(10) Patent No.: US 11,005,406 B2
(45) Date of Patent: May 11, 2021

(54) HYSTERESIS BASED DC OFFSET CORRECTOR FOR CURRENT RECONSTRUCTION WHEN USING DISCONTINUOUS PWM

(71) Applicant: Toshiba International Corporation, Houston, TX (US)

(72) Inventors: Goutham Selvaraj, Houston, TX (US); Yu Liu, Katy, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 16/527,872

(22) Filed: Jul. 31, 2019

(65) Prior Publication Data

US 2021/0036647 A1    Feb. 4, 2021

(51) Int. Cl.
*H02P 27/08*    (2006.01)
*H02M 7/5387*    (2007.01)
*H02M 1/38*    (2007.01)

(52) U.S. Cl.
CPC ........ *H02P 27/08* (2013.01); *H02M 7/53873* (2013.01); *H02M 2001/385* (2013.01)

(58) Field of Classification Search
CPC .............. H02M 1/14; H02M 7/53873; H02M 2001/385; G05F 1/00; H02P 27/08; Y02B 70/10
See application file for complete search history.

(56) References Cited

U.S. PATENT DOCUMENTS

2014/0333241 A1\* 11/2014 Zhao .................. H02P 6/08
318/400.02

FOREIGN PATENT DOCUMENTS

JP    2001078494 A    \*    3/2001

OTHER PUBLICATIONS

Chapman, Ken, Xilinx (2008) "Digitally Removing a DC Offset: DSP Without Mathematics", WP279 (v1.0), 16 pages.

\* cited by examiner

*Primary Examiner* — Said Bouziane
(74) *Attorney, Agent, or Firm* — Baker Botts L.L.P.

(57) ABSTRACT

Disclosed embodiments are directed to a technique to remove DC offset from current measurement signals through shunt resistors in digital signal processing for current reconstruction when using discontinuous pulse width modulation (DPWM). Such measurements regarding current are pertinent to a feedback loop used for a system including a DC-link capacitor, inverter, and motor. A method of removing DC offset comprises: determining a three-phase output current signal of an inverter, wherein the inverter is coupled to a motor and a power supply; producing a voltage signal based on the three-phase output current signal and the resistances of one or more shunt resistors disposed in the inverter; applying an analog gain circuit to the voltage signal; processing the voltage signal with an analog-to-digital converter (ADC); applying a DC offset corrector to the voltage signal; and performing current reconstruction on the voltage signal to produce a continuous current signal.

20 Claims, 12 Drawing Sheets

PRIOR ART

PRIOR ART

PRIOR ART

HYSTERESIS BASED DC OFFSET CORRECTOR FOR CURRENT RECONSTRUCTION WHEN USING DISCONTINUOUS PWM

TECHNICAL FIELD

Embodiments of the present disclosure relate to inverter output or motor current feedback measurements, more particularly, to a DC offset corrector for use in current reconstruction for discontinuous pulse width modulation.

BACKGROUND

Induction motors are well known as industrial drives. Typically, a DC-link capacitor supplies power to the motor through an inverter. The inverter can switch between individual output loads to power the motor. Pulse width modulation (PWM) has been used to control the source supply to a load by controlling the frequency and duration of switching between connected and disconnected positions in the inverter. PWM can be ideal to use as it provides a continuous signal, and the motor must run on a continuous signal. It is often desirable to accurately measure the motor phase current in a feedback loop implemented with the motor to improve upon the performance of the motor or to ensure that the motor is operating correctly.

Currently, low pass filters have been used during processing to calculate the amount of DC offset to remove, as there is typically a DC offset value added because most of the low cost and inbuilt analog-to-digital (ADC) converters in Digital Signal Processors (DSPs) are unipolar and cannot process negative values. This arrangement is only efficient in removing the DC offset if the source signal is continuous and periodic. Although this arrangement provides accurate results, there is a limit as to which frequencies may be analyzed, there is a phase lag due to the filter, and the shape of the reconstructed current curve is distorted as the load increases when used with a discontinuous PWM method because there is discontinuity in the current information obtained.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1A:
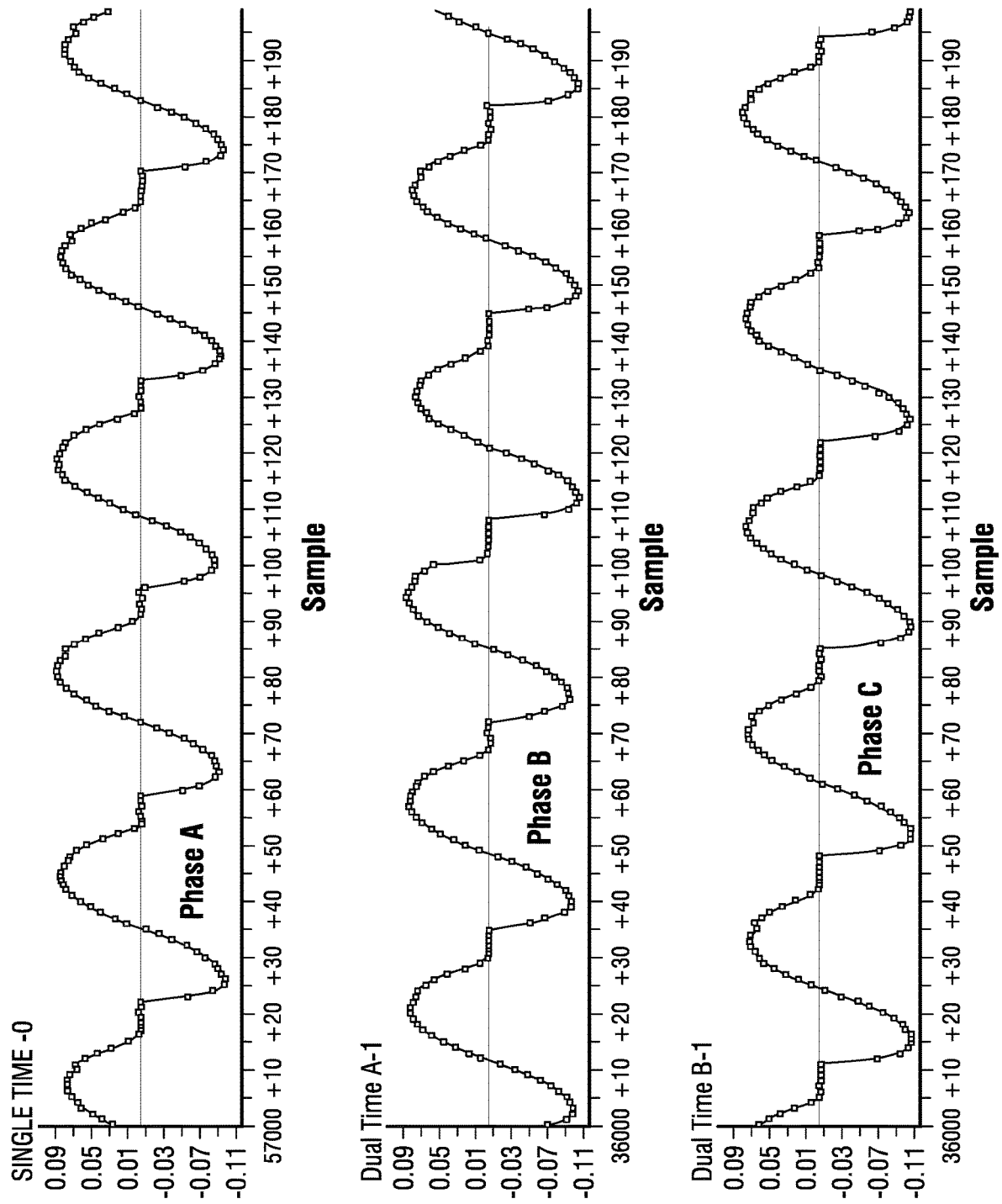
FIGS. 1A-1B illustrate a DC offset calculation using a low pass filter at different loads, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

In one or more embodiments of the present disclosure, an information handling system may be utilized to control, manage or otherwise operate one or more operations, devices, components, networks, any other type of system or any combination thereof. For purposes of this disclosure, an information handling system may include any instrumentality or aggregate of instrumentalities that are configured to or are operable to compute, classify, process, transmit, receive, retrieve, originate, switch, store, display, manifest, detect, record, reproduce, handle, or utilize any form of information, intelligence, or data for any purpose, for example, for a maritime vessel or operation. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data, instructions or both for a period of time. Computer-readable media may include, for example, without limitation, storage media such as a sequential access storage device (for example, a tape drive), direct access storage device (for example, a hard disk drive or floppy disk drive), compact disk (CD), CD read-only memory (ROM) or CD-ROM, DVD, RAM, ROM, electrically erasable programmable read-only memory (EEPROM), and/or flash memory, biological memory, molecular or deoxyribonucleic acid (DNA) memory as well as communications media such wires, optical fibers, microwaves, radio waves, and other electromagnetic and/or optical carriers; and/or any combination of the foregoing.

Figure 1B:
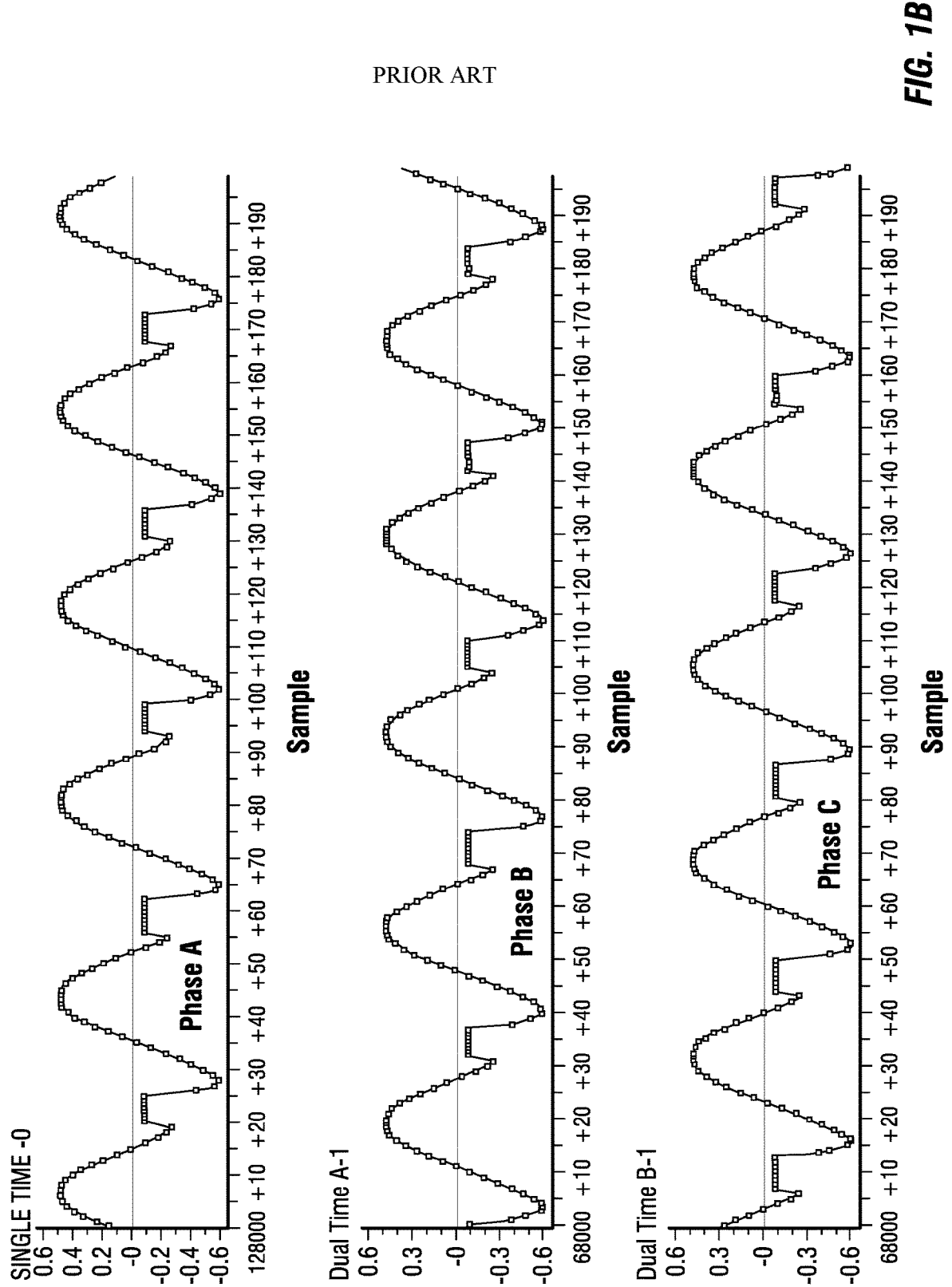
Figure 2A:
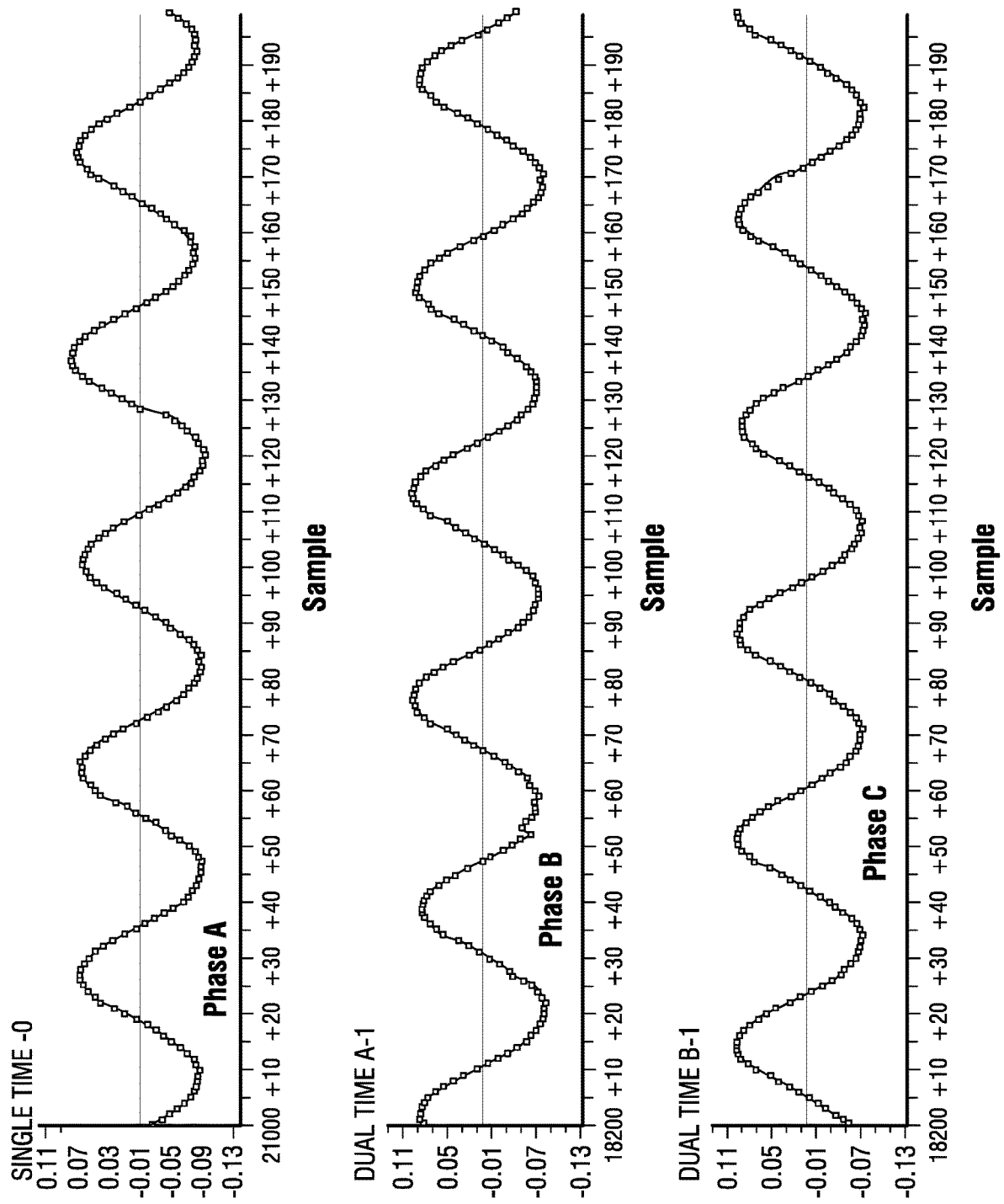
FIGS. 2A-2B illustrate current reconstruction based on the calculations done in FIGS. 1A-1B, in accordance with an embodiment of the present disclosure.
Figure 2B:
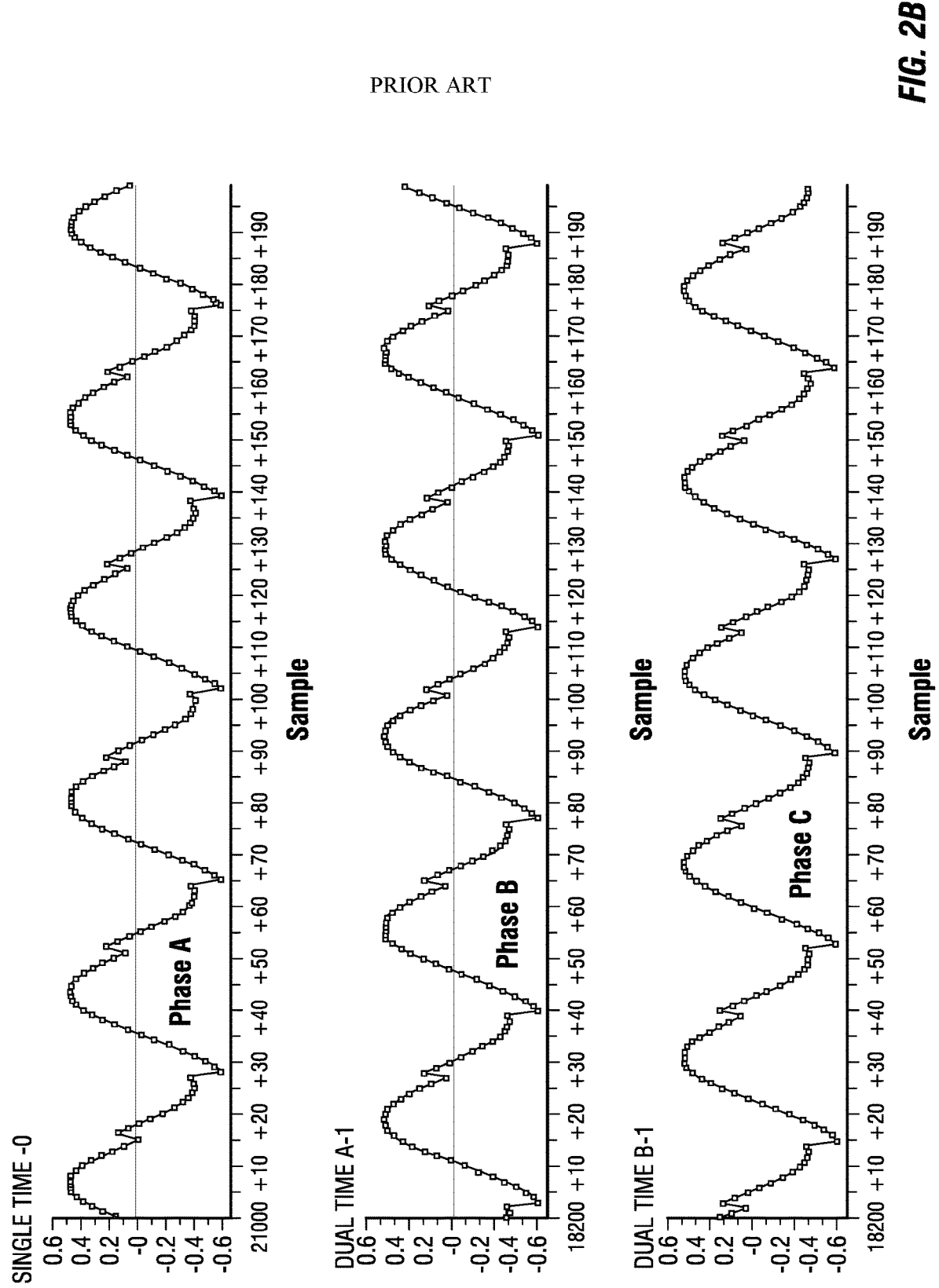

Disclosed embodiments are directed to a technique to remove DC offset from current measurement signals through shunt resistors in digital signal processing for current reconstruction when using discontinuous pulse width modulation (DPWM). Such measurements regarding current are pertinent to a feedback loop used for a system including a DC-link capacitor, inverter, and motor. It is well known that low pass filters have conventionally been used to remove DC offset in such systems. They have been efficient when the source signal is both continuous and periodic. With regards to the present disclosure, the system is using DPWM. Implementing current reconstruction with such a source signal and low pass filters will result in a poor current waveform and measurement. With reference to FIGS. 1A and 1B, the amount of energy provided to a load alters the waveform of a designated phase. Both FIGS. 1A and 1B depict DC offset removed from current signals using a low pass filtering method prior to current reconstruction. As illustrated, at an initial load, there is a discontinuity when using DPWM. As the amount of load increases, the discontinuity increases as well, thereby increasing the error in the signal. When low pass filters are used for current reconstruction with the discontinuous signal, the initial load measurement is able to be processed as the discontinuity is not greatly outlying from the other data, as illustrated in FIG. 2A. As shown in FIG. 2B, when the low pass filter is used for DC offset calculation, the reconstructed current signals have more distinct discontinuity when the DPWM method is used in an inverter. The motor of the system subsequently will not be able to operate properly as the motor control in the DSP requires a continuous current measurement in order to be able to control the motor properly. It is now recognized that a need exists for a current reconstruction circuit with a DC offset corrector capable of processing the discontinuities present in the measured current signals due to DPWM.

Figure 3:
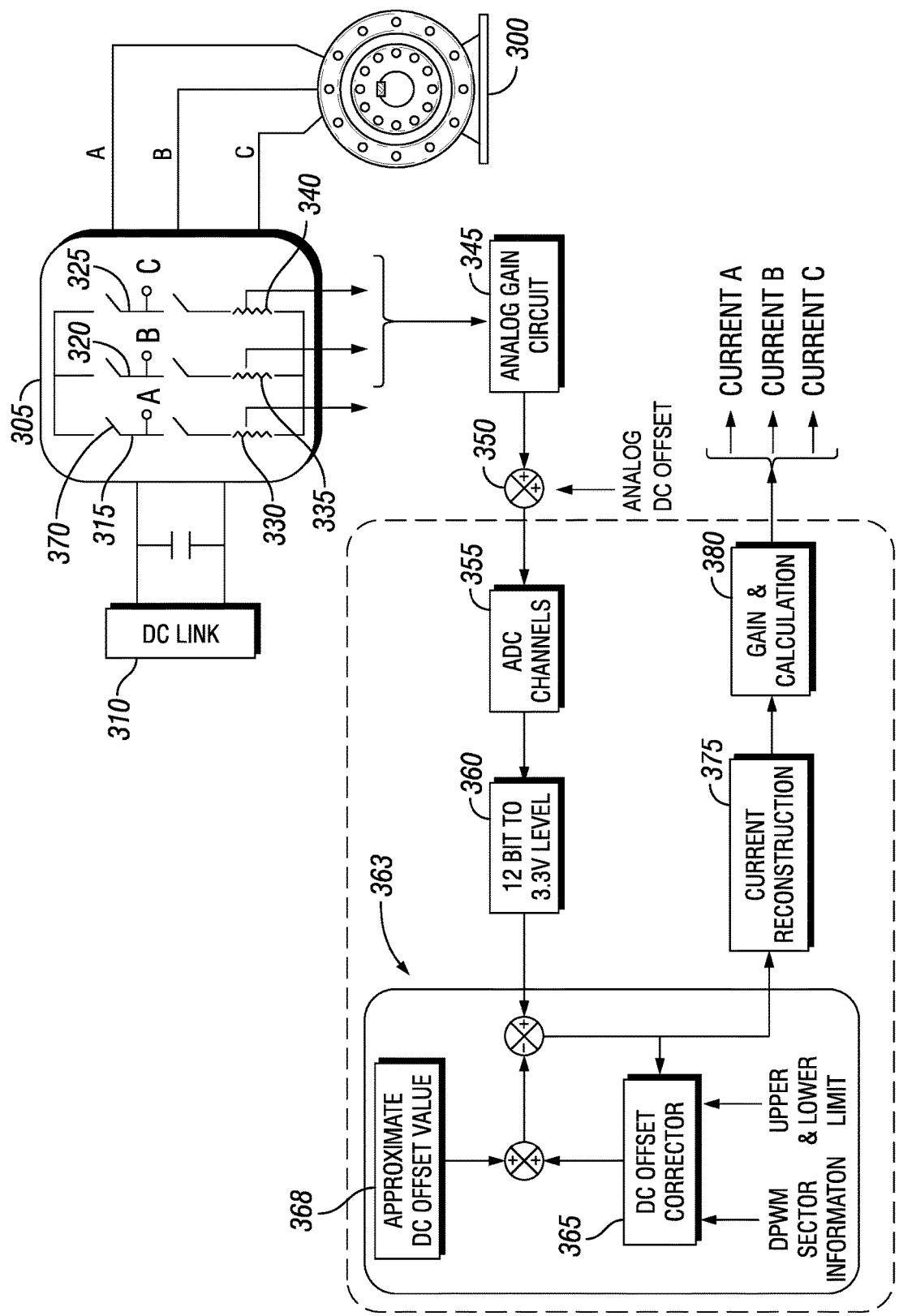
FIG. 3 illustrates a schematic block diagram of the DC offset corrector used with discontinuous pulse width modulation, in accordance with an embodiment of the present disclosure.

FIG. 3 illustrates a schematic block diagram of the DC offset corrector as a part of the feedback control loop for a motor 300, an inverter 305, and a power supply 310. The power supply 310 may be any suitable device capable of supplying power to a system. Without limitations, the power supply 310 may be a DC-link capacitor. In embodiments, the power supply 310 may provide power to operate the motor 300. In embodiments, the motor 300 may be an AC electric motor. The power supply 310 may be coupled to the motor 300 through the inverter 305. Without limitations, the inverter 305 may be any suitable device capable of transforming direct current to alternating current. In embodiments, the inverter 305 is a three-phase inverter. The feedback loop may comprise any suitable wiring and/or circuitry for processing and to communicatively couple the inverter 305 to the power supply 310 and the motor 300. As depicted, the inverter 305 may comprise three single-phase switches 315, 320, 325 (collectively referred to as "switch(es) 315) each connected to one of the three load terminals. During operations, the inverter 305 may selectively actuate any two switches from the three single-phase switches 315, 320, 325 in order to provide three-phase power to the motor 300.

Control and feedback circuitry may be used to adjust the final output of the inverter 305 which will determine the speed of the motor 300 operating under its mechanical load. Motor speed control needs are numerous and include things like: industrial motor driven equipment, electric vehicles, rail transport systems, and power tools.

In order to implement the inverter output current protection in DSP or to implement a feedback control loop between the motor 300, the inverter 305, and the power supply 310, it is necessary to measure the three-phase output currents of the inverter 305 which go to the motor 300. The measured current signals are then sent to DSP with the help of ADC to use as feedback signals to implement the current protection for the inverter 305 or to be used for any other motor control methodologies for the system.

Typically, current measurement in inverters are done by using either two or three quantities of Hall Current Transducers (HCTs) at the output side of the inverter to directly measure the current signals, but for low cost applications and for small foot-print inverters or motor drive systems, inverter phase leg shunt resistors are widely used to extract the inverter output current information. When shunt resistors are used in the inverter phase legs, output current of the inverter may be calculated by measuring the voltage drop across the shunt resistors when the inverter currents flow through the shunt resistors. Moreover, due to the nature of pulse width modulation (PWM) methodology, reconstruction of the current signals may be needed to consistently provide the proper current signals.

Figure 4A:
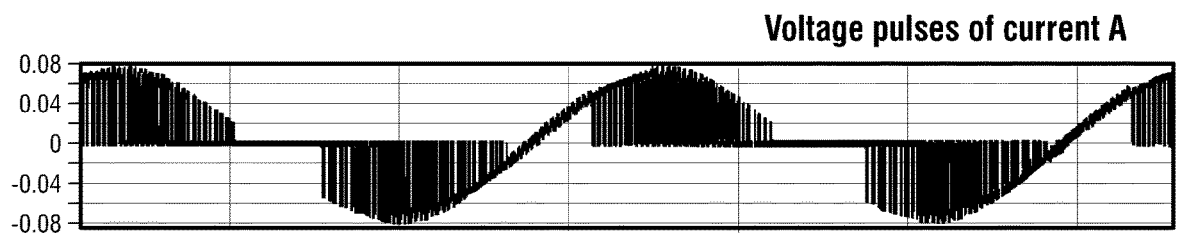
FIGS. 4A-4C illustrate voltage signals derived from the known current and resistor values within the inverter, in accordance with an embodiment of the present disclosure.
Figure 4B:
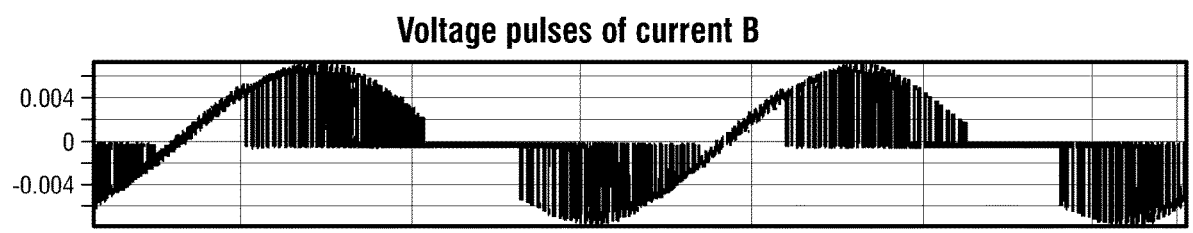
Figure 4C:
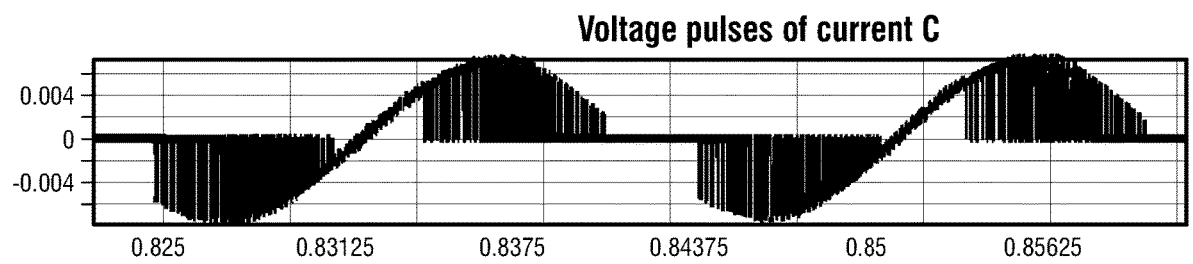

For current measurement using shunt resistors, the voltage across each one of shunt resistors 330, 335, 340 may be measured when the inverter output current flows through each of shunt resistors 330, 335, 340 (collectively referred to as "resistor(s) 330). In embodiments, each one of the switches 315 may be in series with one of the resistors 330 in order to obtain measurements regarding each phase switch 315, as illustrated in FIGS. 4A-4C. As shown, FIGS. 4A-4C depict the voltage signals across the resistors 330, 335, 340 (i.e., referring to FIG. 3). FIG. 4A illustrates a graph depicting the voltage signal across the shunt resistor 330 which is associated with phase switch 315 (i.e., referring to FIG. 3). FIG. 4B illustrates a graph depicting the voltage signal across the shunt resistor 335 which is associated with phase switch 320 (i.e., referring to FIG. 3). FIG. 4C illustrates a graph depicting the voltage signal across the shunt resistor 335 which is associated with phase switch 325 (i.e., referring to FIG. 3). These voltage values of the signal may be determined by applying equations relating voltage to the known current and resistance values.

Figure 5A:
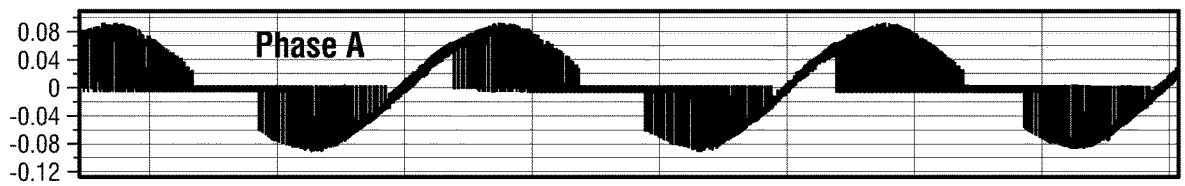
FIGS. 5A-5C illustrate voltage signals processed with an analog gain, in accordance with an embodiment of the present disclosure.
Figure 5B:
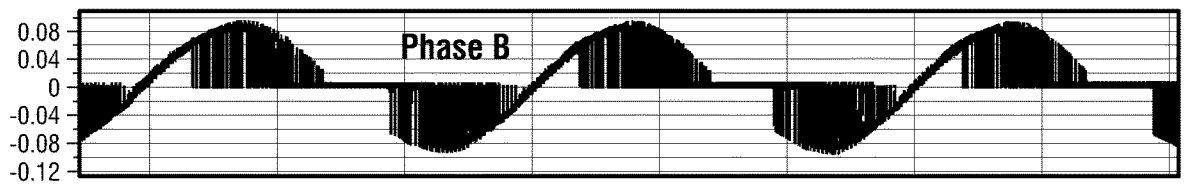
Figure 5C:
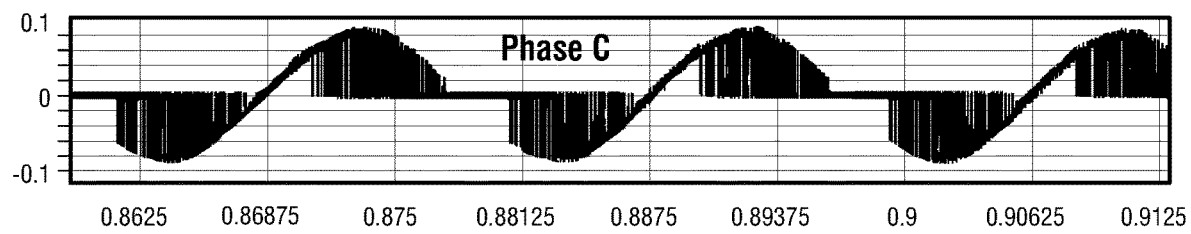
Figure 6A:
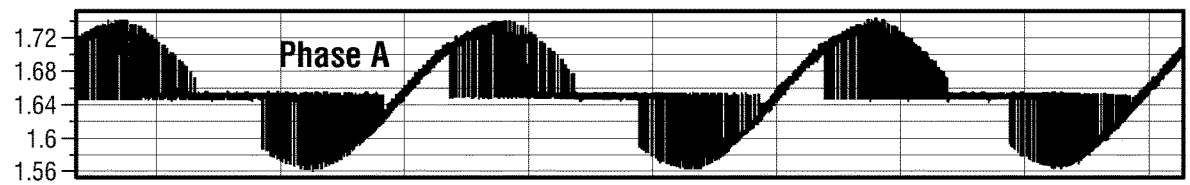
FIGS. 6A-6C illustrate voltage signals added with an analog DC offset before going to ADC in the DSP, in accordance with an embodiment of the present disclosure.
Figure 6B:
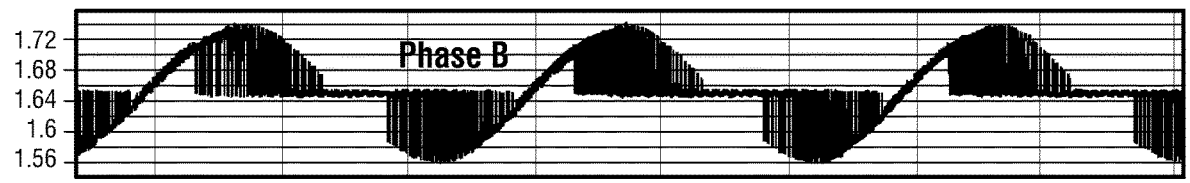
Figure 6C:
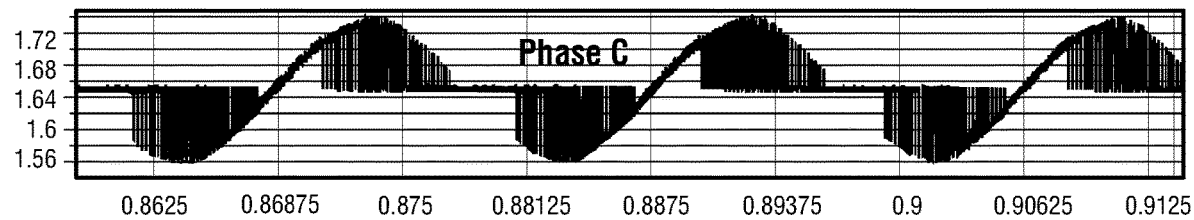

Wither reference back to FIG. 3, the voltage signal may then be processed through an analog gain circuit 345 and a DC offset 350 may be added. Without limitations, the analog gain circuit 345 may increase the signal by any suitable factor, and the DC offset 350 value may be any suitable voltage. In embodiments, the analog gain circuit 345 may increase the signal by a desired gain to bring the voltage value available across each one of the resistors 330 to a readable voltage value, as illustrated in FIGS. 5A-5C. Without limitations, the analog gain circuit 345 may increase the signal by a factor of 10. The DC offset 350 value may be approximately 1.5 or 1.65 volts depending on an input voltage range of the unipoloar ADC which may be either a 0 to 3 volt or 0 to 3.3 volt range respectively, as illustrated in FIGS. 6A-6C. Each set of FIGS. 5A-5C and 6A-6C correspond to a signal regarding a specific one of the phase switches 315 (i.e., referring to FIG. 3) similarly to FIGS. 4A-4C. In embodiments, FIG. 4A depicts an original signal for a given phase switch 315, FIG. 5A depicts the original signal being processed, and FIG. 6A depicts further processing of said signal. FIGS. 5B-5C and 6B-6C has likewise relationships with FIGS. 4B-4C.

Referring back to FIG. 3, after applying the gain and offset to the voltage signals, the signals may undergo digital signal processing while being in a range of 0 to 3.3 volts. In embodiments, the signals may be processed by an analog-to-digital converter 355, thereby converting the signals into a digital format. In embodiments, the analog-to-digital converter 355 may be a 12-bit ADC, wherein the converted signals will be in 12-bit format (0 to 4096 combinations). The signals may then go through a process at block 360 wherein the 12-bit converted signals will be converted to 0 to 3.3 volts.

Figure 7A:
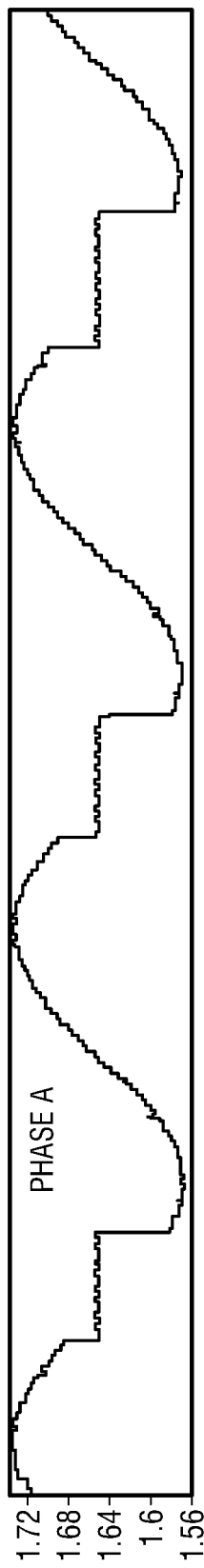
FIGS. 7A-7C illustrate voltage signals converted to a digital format by ADC in the DSP, in accordance with an embodiment of the present disclosure.
Figure 7B:
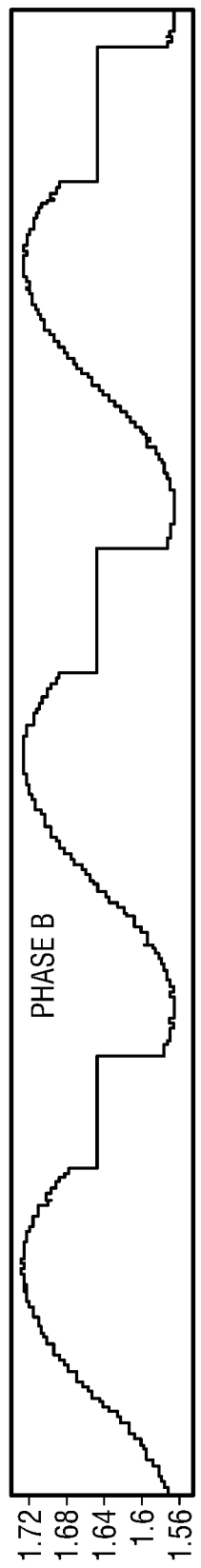
Figure 7C:
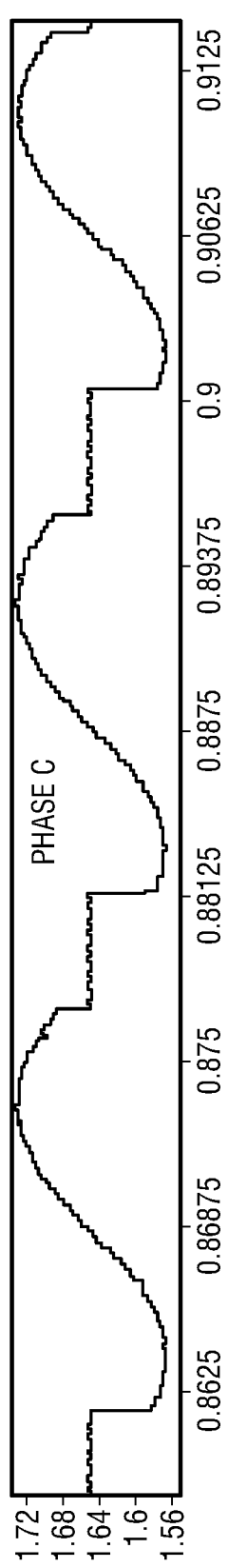

After being processed at block 360, the DC offset present in the converted signals may be removed from the signals, as shown in FIGS. 7A-7C, with a DC offset removal technique block 363. The DC offset removal technique block 363 may comprise of a DC offset corrector 365 and an approximate DC offset removal value 368. The DC offset corrector 365 may serve to provide additional adjustment required to determine the correct offset value which can then be used to remove the actual DC offset from the signals prior to current reconstruction. The DC offset corrector 365 may have a plurality of inputs including, but not limited to, the DPWM sector information, an upper limit, a lower limit, and/or combinations thereof. Without limitations, the upper limit may be about 0.0001, and the lower limit may be about −0.0001. In embodiments, the value determined by the DC offset corrector 365 may be combined with the approximate DC offset removal value 368. Without limitations, this approximate DC offset removal value 368 may be any suitable value. In embodiments, the approximate DC offset removal value 368 may be equivalent to that of the DC offset 350 value (i.e., 1.5 or 1.65 volts). The combined values of the DC offset corrector 365 and the approximate DC offset removal value 368 may be used to remove the DC offset from the signals. The approximate DC offset removal value 368 may always remove the designated value from the signals, but the DC offset corrector 365 may operate selectively in a closed-loop fashion based on particular DPWM sector information, and by using the voltage signals as its feedback signals, which are the signals produced after removing the DC offset. In embodiments, the DC offset corrector 365 and approximate DC offset removal value 368 may remove DC offset from the voltage signals in order to reach an approximate value of zero. If the value of the voltage signals is outside the upper and lower limits, an adjustment may be made in the feedback loop to increase or decrease the value of the DC offset corrector 365 to keep the voltage signal values within the upper and lower limits.

Figure 8:
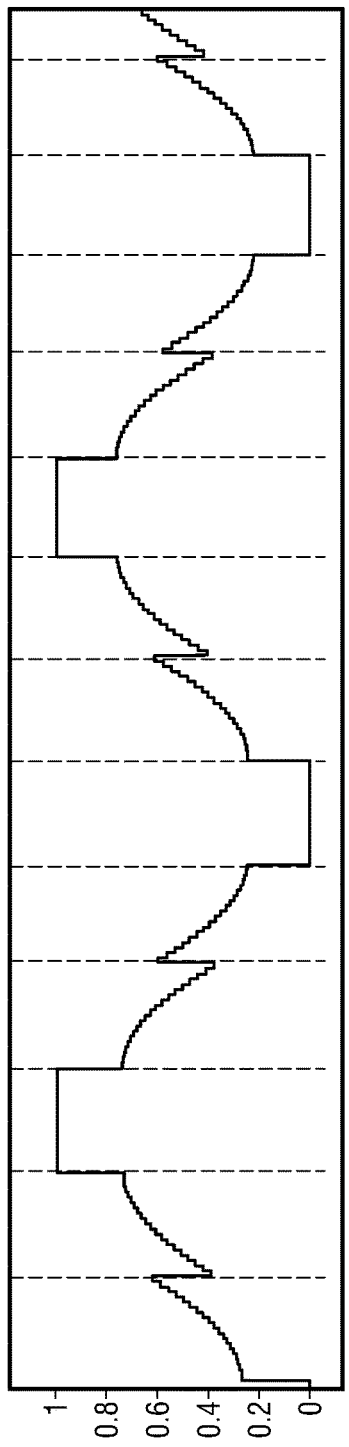
FIG. 8 illustrates DPWM sector information in a PWM cycle, in accordance with an embodiment of the present disclosure.

The DPWM sector information may be defined herein as the different phase sector information in a PWM cycle. There may be six sectors in a PWM cycle and each sector has 60 degrees as shown in the FIG. 8. In embodiments, the current may be zero in only one of the phase sectors of a PWM cycle. When in sector 2, as shown in FIG. 8, the DPWM may be clamped to a max value for 60 degrees (i.e., from 120 degrees to 180 degrees). In embodiments, during this duration, the phase switch 315 in the inverter 305 may connect the power supply 310 to the motor 300 through a top switch 370 of the phase switch 315, which may inhibit the inverter 305 current from flowing through the resistor 330. As shown, the current may be zero within sector 2. This may occur similarly for other phase switches 320 and 325.

Figure 9A:
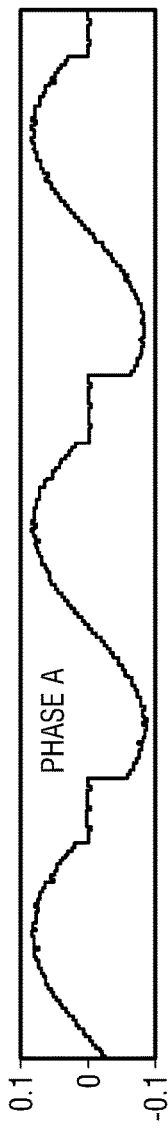
FIGS. 9A-9C illustrate voltage signals after removing the DC offset, in accordance with an embodiment of the present disclosure.
Figure 9B:
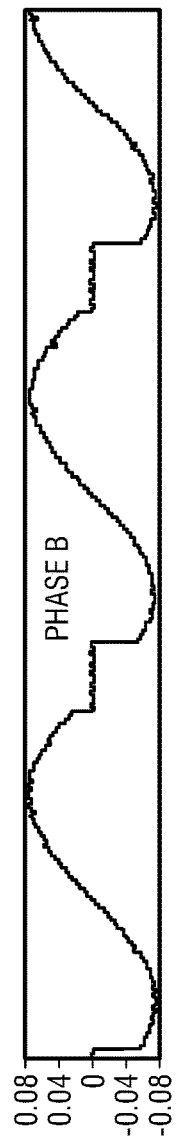
Figure 9C:
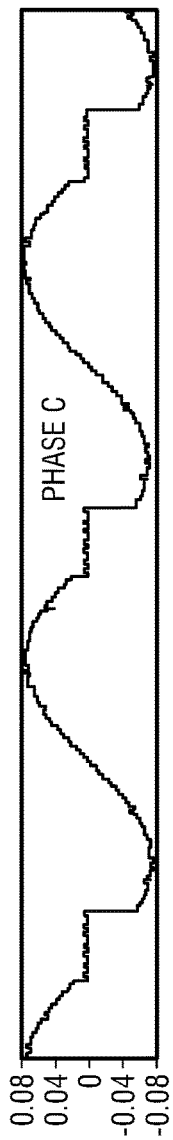

In order to apply a continuous current to the motor 300, the DC offset present in the voltage signals may need to be completely removed prior to current reconstruction so as to represent continuous current signals when the voltage signals undergo the current reconstruction 375 and a gain and calculation 380. The DC offset corrector 365 may ensure the complete removal of DC offset by forcing the voltage signals to zero within the phase sector where there is a discontinuity as the approximate DC offset removal value 368 will not remove all of the DC offset present in the signal. This method may be advantageous as the selectivity of the DC offset corrector 365 may reduce processing time when compared to a low pass filter-based DC offset removal method. FIGS. 9A-9C illustrate the voltage signals after removing the DC offset value. These voltage signals may then undergo current reconstruction 375.

Figure 10A:
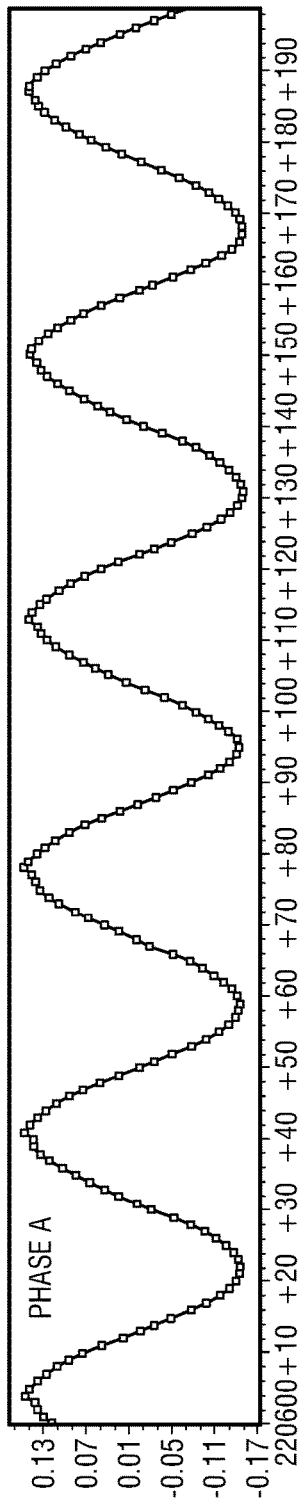
FIGS. 10A-10C illustrate reconstructed current signals using the proposed DC offset corrector, in accordance with an embodiment of the present disclosure.
Figure 10B:
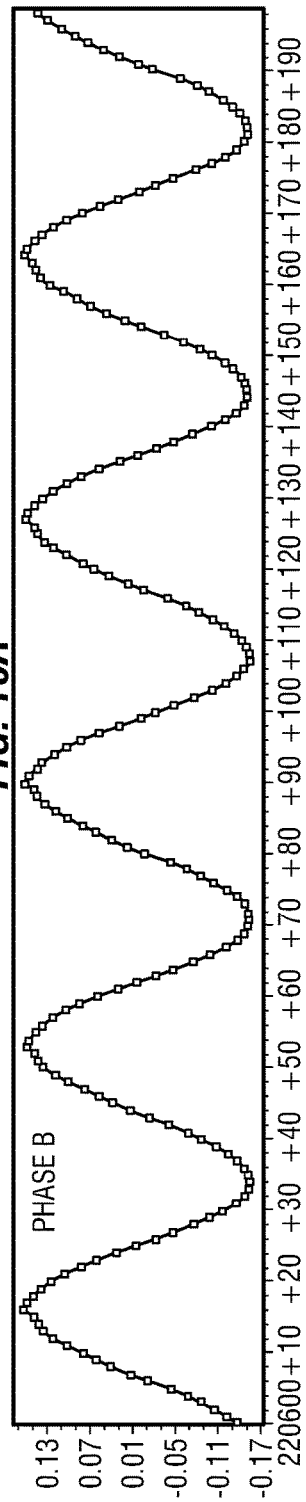
Figure 10C:
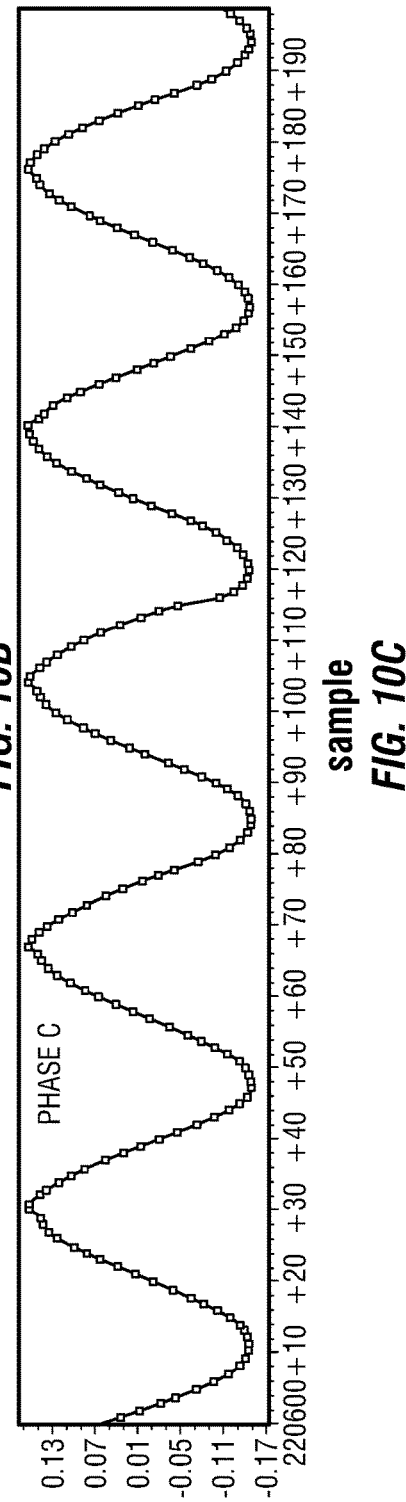

In embodiments, an input to the current reconstruction 375 may be the DPWM sector information. In current reconstruction 375, the discontinuity in each of the voltage signals (as seen in FIGS. 9A-9C) may be reconstructed by using the other two phase voltage signals to create continuity. The equation for the current reconstruction 375 is based on Kirchhoff's current rule for balanced star connected network. In embodiments, the discontinuity in the voltage signal of phase A during a DPWM sector, as shown in FIG. 9A, may be reconstructed with the other two voltage signals as shown in FIG. 9B and FIG. 9C to create continuity. After the current reconstruction 375, a gain and calculation may be applied at block 380, wherein the output is the currents flowing from the inverter 305 to the motor 300. Without limitations, the gain may be equivalent to the value of the gain from analog gain circuit 345, and the calculation may be known relationships between voltage, current, and resistance. FIGS. 10A-10C illustrate the signals after undergoing the current reconstruction 375 and the gain and calculation at block 380. As illustrated, each figure represents the current associated with a specific phase switch 315, similar to the previous figures.

The disclosed system and method may be used in conjunction with an information handling system, which in some embodiments may be a computer system. As those of ordinary skill in the art will appreciate, the computer may be equipped with a computer memory storage (and optionally a local processor) so that it can store (and also optionally at least partially process) the signals that it receives.

Figure 11:
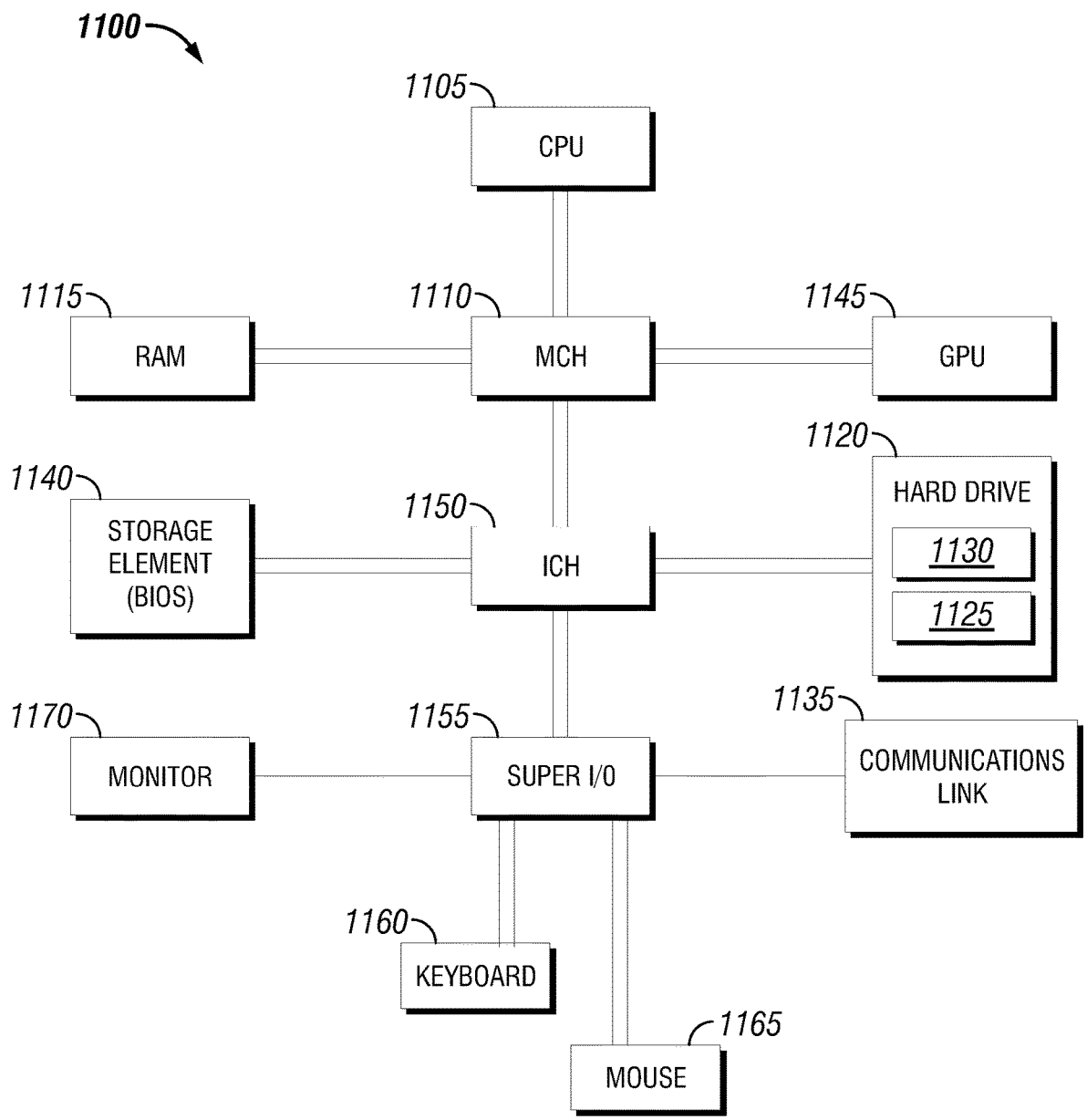
FIG. 11 illustrates an information handling system, in accordance with an embodiment of the present disclosure.

FIG. 11 is a diagram illustrating an example information handling system 1100, for example, for use with or by the feedback control loop of FIG. 3, according to one or more aspects of the present disclosure. A processor or central processing unit (CPU) 1105 of the information handling system 1100 is communicatively coupled to a memory controller hub (MCH) or north bridge 1110. The processor 1105 may include, for example a microprocessor, microcontroller, digital signal processor (DSP), application specific integrated circuit (ASIC), or any other digital or analog circuitry configured to interpret and/or execute program instructions and/or process data. Processor 1105 may be configured to interpret and/or execute program instructions or other data retrieved and stored in any memory such as memory 1115 or hard drive 1120. Program instructions or other data may constitute portions of a software or application, for example application 1125 or data 1130, for carrying out one or more methods described herein. Memory 1115 may include read-only memory (ROM), random access memory (RAM), solid state memory, or disk-based memory. Each memory module may include any system, device or apparatus configured to retain program instructions and/or data for a period of time (for example, non-transitory computer-readable media). For example, instructions from a software or application 1125 or data 1130 may be retrieved and stored in memory 1115 for execution or use by processor 1105. In one or more embodiments, the memory 1115 or the hard drive 1120 may include or comprise one or more non-transitory executable instructions that, when executed by the processor 1105, cause the processor 1105 to perform or initiate one or more operations or steps. The information handling system 1100 may be preprogrammed or it may be programmed (and reprogrammed) by loading a program from another source (for example, from a CD-ROM, from another computer device through a data network, or in another manner).

The one or more applications 1125 may comprise one or more software applications, one or more scripts, one or more programs, one or more functions, one or more executables, or one or more other modules that are interpreted or executed by the processor 1105. The one or more applications 1125 may include machine-readable instructions for performing one or more of the operations related to any one or more embodiments of the present disclosure. The one or more applications 1125 may generate output data and store the output data in the memory 1115, hard drive 1120, in another local medium, or in one or more remote devices (for example, by sending the output data via the communication link 1135).

Modifications, additions, or omissions may be made to FIG. 11 without departing from the scope of the present disclosure. For example, FIG. 11 shows a particular configuration of components of information handling system 1100. However, any suitable configurations of components may be used. For example, components of information handling system 1100 may be implemented either as physical or logical components. Furthermore, in some embodiments, functionality associated with components of information handling system 1100 may be implemented in special purpose circuits or components. In other embodiments, functionality associated with components of information handling system 1100 may be implemented in configurable general-purpose circuit or components. For example, components of information handling system 1100 may be implemented by configured computer program instructions.

Memory controller hub 1110 may include a memory controller for directing information to or from various system memory components within the information handling system 1100, such as memory 1115, storage element 1140, and hard drive 1120. The memory controller hub 1110 may be coupled to memory 1115 and a graphics processing unit (GPU) 1145. Memory controller hub 1110 may also be coupled to an I/O controller hub (ICH) or south bridge 1150. I/O controller hub 1150 is coupled to storage elements of the information handling system 1100, including a storage element 1140, which may comprise a flash ROM that includes a basic input/output system (BIOS) of the computer system. I/O controller hub 1150 is also coupled to the hard drive 1120 of the information handling system 1100. I/O controller hub 1150 may also be coupled to an I/O chip or interface, for example, a Super I/O chip 1155, which is itself coupled to several of the I/O ports of the computer system, including a keyboard 1160, a mouse 1165, a monitor 1170 and one or more communications link 1135. Any one or more input/output devices receive and transmit data in analog or digital form over one or more communication links 1135 such as a serial link, a wireless link (for example, infrared, radio frequency, or others), a parallel link, or another type of link.

The one or more communication links 1135 may comprise any type of communication channel, connector, data communication network, or other link. For example, the one or more communication links 1135 may comprise a wireless or a wired network, a Local Area Network (LAN), a Wide Area Network (WAN), a private network, a public network (such as the Internet), a WiFi network, a network that includes a satellite link, or another type of data communication network.

Although the disclosure and its advantages have been described in detail, it should be understood that various changes, substitutions and alterations can be made herein without departing from the spirit and scope of the disclosure as defined by the following claims.

What is claimed is:

1. A method of removing DC offset from voltage signals, comprising:
   determining a three-phase output current signal of an inverter, wherein the inverter is coupled to a motor and a power supply;
   producing a voltage signal based on the three-phase output current signal and the resistances of one or more shunt resistors disposed in the inverter;
   applying an analog gain circuit to the voltage signal;
   processing the voltage signal with an analog-to-digital converter (ADC);
   applying a DC offset corrector to the voltage signal, wherein the DC offset corrector is configured to operate in a closed feedback loop to remove DC offset from the voltage signal until the DC offset is within an upper limit and a lower limit; and
   performing current reconstruction on the voltage signal to produce a continuous current signal.

2. The method of claim 1, wherein each of the one or more shunt resistors is coupled to a phase switch.

3. The method of claim 1, wherein the analog gain circuit increases the voltage signal by a factor of 10.

4. The method of claim 1, further comprising applying a DC offset value to the voltage signal, wherein the DC offset value increases the voltage signal by 1.5 volts or 1.65 volts.

5. The method of claim 1, wherein processing the voltage signal with the ADC converter comprises converting the voltage signal to a digital format.

6. The method of claim 5, wherein the ADC is a 12-bit ADC.

7. The method of claim 1, wherein the DC offset corrector comprises a plurality of inputs, wherein the plurality of inputs comprises discontinuous pulse width modulation (DPWM) sector information, the upper limit, and the lower limit.

8. The method of claim 7, wherein the DPWM sector information provides which phase sector of the voltage signal comprises current at a value of zero.

9. The method of claim 8, wherein the DC offset corrector is applied to the phase sector wherein the current is at the value of zero.

10. The method of claim 1, further comprising of applying an approximate DC offset removal value to the voltage signal.

11. A system, comprising:
    a power supply;
    an inverter, wherein the inverter is coupled to the power supply;
    a motor, wherein the motor is coupled to the inverter; and
    an information handling system comprising a memory and a processor, wherein the information handling system is configured to implement a feedback control loop regarding the power supply, the inverter, and the motor, wherein the feedback control loop comprises an approximate DC offset removal value and a DC offset corrector, wherein the DC offset corrector comprises a plurality of inputs, wherein the plurality of inputs comprises discontinuous pulse width modulation (DPWM) sector information, an upper limit, and a lower limit, wherein the DC offset corrector is configured to operate in a closed feedback loop to remove DC offset from a voltage signal until the DC offset is within the upper limit and the lower limit.

12. The system of claim 11, wherein the information handling system is configured to:
   determine a three-phase output current signal of the inverter; and
   produce the voltage signal based on the three-phase output current signal and the resistances of one or more shunt resistors disposed in the inverter.

13. The system of claim 11, wherein the information handling system is configured to:
   apply an analog gain circuit to the voltage signal, wherein the analog gain circuit increases the voltage signal by a factor of 10.

14. The system of claim 11, wherein the information handling system is configured to:
   process the voltage signal with an analog-to-digital converter (ADC) to convert the voltage signal to a digital format, wherein the ADC is a 12-bit ADC.

15. The system of claim 11, wherein the information handling system is configured to:
   apply the DC offset corrector to the voltage signal; and
   apply the approximate DC offset removal value to the voltage signal.

16. The system of claim 11, wherein the information handling system is configured to:
   perform current reconstruction on the voltage signal to produce a continuous current signal.

17. A circuit to remove DC offset prior to current reconstruction when using discontinuous pulse width modulation (DPWM), comprising:
   an analog gain circuit;
   an analog DC offset;
   an analog-to-digital converter;
   an approximate DC offset removal value; and
   a DC offset corrector, wherein the DC offset corrector comprises a plurality of inputs, wherein the plurality of inputs comprises DPWM sector information, an upper limit, and a lower limit, wherein the DC offset corrector is configured to operate in a closed feedback loop to remove DC offset from a voltage signal until the DC offset is within the upper limit and the lower limit.

18. The circuit of claim 17, wherein the circuit is configured to:
   determine a three-phase output current signal of an inverter, wherein the inverter is coupled to a motor and a power supply; and
   produce the voltage signal based on the three-phase output current signal and the resistances of one or more shunt resistors disposed in the inverter.

19. The circuit of claim 17, wherein the DPWM sector information provides which phase sector of the voltage signal comprises current at a value of zero, wherein the DC offset corrector is applied to the phase sector wherein the current is at the value of zero.

20. The circuit of claim 17, wherein the circuit is configured to:
   perform current reconstruction on the voltage signal to produce a continuous current signal.

* * * * *